United States Patent [19]

Washida

[11] 4,131,820

[45] Dec. 26, 1978

[54] SECONDARY ELECTRON MULTIPLICATION TARGET

[75] Inventor: Hiroshi Washida, Kawasaki, Japan

[73] Assignee: Tokyo Shibaura Electric Co., Ltd., Kawasaki, Japan

[21] Appl. No.: 775,939

[22] Filed: Mar. 9, 1977

Related U.S. Application Data

[63] Continuation of Ser. No. 669,741, Mar. 24, 1976, abandoned.

[51] Int. Cl.[2] .................... H01J 31/00; H01J 31/26; H01J 31/48; B32B 5/16

[52] U.S. Cl. .................... 313/377; 313/399; 428/323; 428/320

[58] Field of Search .................... 428/323, 320; 252/521; 313/376, 377, 378; 427/77, 126

[56] References Cited

U.S. PATENT DOCUMENTS

| | | | |
|---|---|---|---|
| 2,824,247 | 2/1958 | Szegho et al. | 313/379 |
| 3,155,859 | 11/1964 | Koert | 313/378 |
| 3,197,662 | 7/1965 | Schneeberger | 252/521 |
| 3,534,207 | 10/1970 | Blamoutier et al. | 313/377 |

OTHER PUBLICATIONS

Deutschman, "A Calibration Model etc.", Pub. Astron. Soc. Pacific, V. 84, Feb. 1972, #497, pp. 123–126.

*Primary Examiner*—P. C. Ives

*Attorney, Agent, or Firm*—Oblon, Fisher, Spivak, McClelland & Maier

[57] ABSTRACT

A secondary electron multiplication target for a secondary electron conduction type which comprises a conductive support layer and a secondary electron emitting layer deposited on the support layer. This secondary electron emitting layer is a porous layer consisting of fine particles of a humidity proof substance having higher melting point and electric resistance than MgO, for example, $MgF_2$. This porous layer consists mainly of primary particles each having an average particle size of scores of angstroms to five hundred angstroms.

5 Claims, 9 Drawing Figures

SECONDARY ELECTRON MULTIPLICATION TARGET

This is a continuation of application Ser. No. 669,741 filed Mar. 24, 1976, now abandoned.

BACKGROUND OF THE INVENTION

This invention relates to a secondary electron multiplication target for a secondary electron conduction type vidicon, and more particularly to an improved secondary electron emitting layer constituting this target.

The secondary electron multiplication target of the invention is effective particularly as a target for use in a secondary electron conduction type vidicon (hereinafter referred to as "SEC vidicon"). For a better understanding of the construction, function and effect of the invention, with reference to FIGS. 1 and 2 schematically showing a construction of the SEC vidicon to which the target of the invention is applied, the function or action of the SEC vidicon is hereinafter explained, and simultaneously with reference to FIG. 3 general physical phenomenon occuring during a process in which the particles forming a secondary electron emitting layer are deposited on a conductive support layer (a signal-drawing out support plate) is explained. In FIG. 1, a vacuum envelope 1 comprises a tubular glass portion 2, a face plate 3 for sealing the glass portion 2, and a stem portion 4. On the inner surface of the face plate 3 consisting of a transparent glass plate, a photocathode 5 is formed. At a substantially intermediate position between the face plate 3 and the stem portion 4 is disposed a secondary electron conduction target 6 (hereinafter referred to as "SEC target"), which comprises a metal ring **6*a*, a conductive thin film 6*b* (this film concurrently acting as an image signal-drawing out electrode) stretched over the metal ring 6*a*, and a secondary electron emitting porous layer 6*c*. Generally, the left side of the shown target 6 is termed an "image section" and the right side thereof a "scanning section". Within the scanning section are received an electron gun including a cathode electrode 7*a*, control electrode 7*b* and acceleration electrode 7*c*, a focusing electrode 8, a suppressing mesh electrode 9, and a field mesh electrode 10, while outside the scanning section is arranged a coil assembly 11 consisting of a focusing coil and a deflecting coil. Within the image section, electrodes 12*a*, 12*b* and 12*c* are received. The coupling relation between the target 6, the suppressing mesh electrode 9 and the electron gun is shown enlarged in FIG. 2. Examples of voltages to be applied to the photocathode 5, target 6, suppressing mesh electrode 9**, and each of said electrodes are shown in FIGS. 1 and 2.

When, in the SEC vidicon having the foregoing construction the optical image of an object to be picked up is focussed on the photocathode 5, the photoelectrons emitted from the photocathode 5 are accelerated to 8 kv and transmitted through the conductive thin film **6*b* to enter the secondary electron emitting porous layer 6*c*. For this reason, a large number of secondary electrons are emitted from the porous layer 6*c*, and are moved, due to a voltage $V_T$ applied to the conductive thin film 6*b*, toward the conductive thin film 6*b* through the voids of the porous layer 6*c*. As a result, positive charge remains within the porous layer 6*c*. The distribution of the positive charge corresponds to the intensity of the optical image incident into the photocathode 5. At this time, when, in the scanning section, the secondary electron emitting layer or porous layer 6*c* of the target is scanned by scanning beam, said positive charge is neutralized to permit the secondary electrons to flow through a resistor 13 (see FIG. 1). Through drawing out the variation in voltage drop of the resistor 13 through a capacitor 14, an image signal $I_{sig}$ can be obtained. The suppressing mesh electrode 9 is given an appropriate potential necessary to prevent an excessive potential increase in the surface of the target on the scanning side, while the field mesh electrode 10 functions to land the scanning beam on the target surface at right angles thereto. Generally, the reason why the SEC vidicon is a highly sensitive image pickup tube is that the photoelectrons emitted from the photoelectric surface 5** are amplified within the target by said secondary electrons. When the signal current is represented by $I_{sig}$ and the photoelectron current by $I_{pc}$, a gain $G_T$ within the target is expressed by the equation $G_T = I_{sig}/I_{pc}$.

An attempt has been made to apply alkali halide such as KCl or MgO as material constituting the secondary electron emitting porous layer of the target of the SEC vidicon. In the case of using a porous layer consisting of KCl or MgO, or a target containing this porous layer, due to such layer having the below-mentioned drawbacks, a practical image pickup tube having satisfactory characteristics has not been obtained. The secondary electron emitting layer using KCl has the drawbacks that (1) the layer property is likely to be changed due to the layer having high moisture-absorption characteristics; (2) since the layer has a low melting point and low heat resistance, upon incidence of a strong light into the photoelectric surface heat is locally developed within the layer to change the property thereof, and further due to the temperature elevation during the baking step of the manufacturing process the layer property is changed; and (3) the KCl of the layer reacts with alkaline metal produced in the envelope upon forming the photocathode to change the porperty of the layer. The secondary electron emitting layer using MgO has the drawbacks that (1) the layer property is likely to be changed due to the action of alkaline metal produced in the envelope upon forming the photoelectric face; and (2) when, during operation of the image pickup tube, the target voltage $V_T$ is increased, due to an increase in electric field formed between the signal electrode **6*b*** and the surface of the layer on the scanning side the secondary electron emitting layer thickness becomes small, or the particles constituting the layer are agglomerated to change the property of the layer, in which case, the change in property of the layer is prominent particularly when the layer is in a condition having moisture absorbed thereinto or having alkaline metal adhered thereto.

The structure change due to aggregation of particles constituting the secondary electron emitting layer leads to unevenness of secondary electron emission. As a result, a grainy picture appears on a picture screen. Therefore, the picture quality of the SEC vidicon whose secondary electron emitting layer is made of KCL or MgO is not good. Particularly when the gain $G_T$ is increased by raising the target voltage $V_T$, such grainy picture prominently appears. And when the gain $G_T$ is increased up to 20 to 30, the SEC vidicon can no longer be used as a broadcasting image pickup tube. When, as above described, in addition to the fact that the picture quality of the SEC vidicon is originally not good, particles are excessively agglomerated during forming the secondary electron emitting layer, or this agglomerated condition is varied also after the formation of the emitting layer, the picture quality is further deteriorated. Furthermore, when the layer thickness becomes small with the variation of an agglomerated condition of particles, the duration of lag or after image becomes long. Furthermore, when agglomeration of the particles constituting the layer is promoted by incidence of photoelectrons or scanning beams during operation of the image pickup tube, the layer property is deteriorated permanently.

As a result of having experimentally studied the causes of production of said grainy picture in the image pickup tube using KCl or MgO as a target material, the present inventor has come to the following conclusions. That is to say, the secondary electron emitting layer is an aggregate of fine particles. Where the layer is made of KCl, these fine particles are obtained by evaporating the KCl in an atmosphere of inert gas (for example, $N_2$, Ar, etc.). Where the layer is made of MgO, those fine particles are obtained by burning metallic magnesium in an atmosphere containing oxygen. In any of the above cases, said fine particles are grown in an atmosphere between an evaporation source (KCl) or a burning source (Mg) 16 received in a boat 15 shown in FIG. 3 and the support film *6b*. The growth of said fine particles is effected in that region in the neighbourhood of the evaporation source 16 in which the temperature is higher than prescribed, and is stopped in that region apart from the evaporation source 16 in which the temperature is not more than prescribed. Where, after the growth of the fine particles is completed, some distance is left between the upper part of a growth region of the particles and the support film, the fine particles collide with each other in a space corresponding to said some distance, so that an aggregate of the fine particles is formed. The size of this aggregate depends upon, for example, the pressure of said atmosphere. Hereinafter, the fine particles obtained through the growth at said growth region of fine crystals formed from the evaporation source or burning source 16 at the initial stage are referred to as "primary particles", and the particles obtained through the agglomeration of the primary particles to reach the support film *6b* are referred to as "secondary particles". The primary particle is generally monocrystalline (provided that in some cases it is polycrystalline), whereas the secondary particle is an aggregate of the monocrystalline particles and therefore is highly porous. The secondary particles are deposited on the support layer *6b*. It should be noted, however, that the growth of fine crystals (primary particles) on the support film is not effected unlike the case with vacuum deposition, but that since, as above described, the secondary particle itself is porous and carried up to the support film *6b* by a heated gas flow in the high temperature atmosphere, it fails to be uniformly deposited on the support film and this deposited layer contains tertiary particles formed by further agglomeration of the secondary particles. Due to containing these tertiary particles, the secondary electron emitting layer undergoes the formation therein of spatially rough and dense portions and the formation thereon of irregularities. The secondary and tertiary particles can be discriminated from each other by an electron microscope and optical microscope and their respective average particle size can be observed for measurement by the use of such microscopes. According to the present inventor's measurement, when burning metallic magnesium in the air, the average particle size of the primary particle was on the order of 1000 A to 1 $\mu$, the average particle size of the secondary particles was several microns, and the average particle size of the tertiary particles was scores of microns.

Through the above observation the following facts have been found. (1) The larger the average size of the primary particle, the larger the average size of the secondary and tertiary particles. (2) Even after the secondary electron emitting layer *6c* has been deposited on the conductive thin film *6b*, when the layer *6c* absorbs moisture or alkaline metal is adhered to the layer *6c*, said tertiary particles are formed. (3) Where the layer *6c* is made of MgO, said tertiary particles are formed also in the case where the layer *6c* is scanned with the target voltage $V_T$ increased up to a value greater than prescribed. (4) Where the average size of said tertiary particle exceeds 10 $\mu$m, it becomes approximate to the diameter of a scanning beam, so that the unevenness with which the secondary electrons are emitted (when the particle size is different, the number of secondary electrons emitted is different based on the same amount of inciding photoelectrons) is read, or the unevenness with which the scanning beam is landed on the layer *6c* occurs. These phenomena are causes of production of the above-mentioned grainy picture. (5) When the layer *6c* having a thickness of, for example, microns, is scanned with a target voltage $V_T$=30 volts, the electric field strength between the conductive layer *6b* and the free surface of the layer *6c* will reach about $3\times10^4$ V/cm. This causes the porous layer *6c* to contract in three dimensional directions. Therefore, the ternary particles are liable to be formed. The unevenness in the spacing of particles constituting the porous layer which emits secondary electrons leads to uneven emission of secondary electrons. The uneven emission results in a grainy picture. In the pickup tube having a target having a diameter of about 25 mm, the size of the visible image on the screen of a receiver is generally magnified 20 times as large as the target size. If the image on a receiver has an unevenness of 0.2 mm cycle, the unevenness becomes visible on the screen. If the unevenness exists all over the target, a grainy picture appears on the screen. The cycle of the unevenness on the target should therefore be limited to below 10 microns.

Accordingly, it is the object of the invention to provide a secondary electron multiplication target capable of eliminating the conventional drawbacks, through the above-mentioned experimental observation.

SUMMARY OF THE INVENTION

The secondary electron multiplication target for a secondary electron conduction type vidicon according to the invention comprises a conductive support layer and a secondary electron emitting layer deposited on the conductive support layer. The secondary electron emitting layer is a porous layer consisting of fine particles of $CaF_2$ or $MgF_2$ or $SrF_2$, and mainly consists of primary particles each having an average particle size of scores of angstroms to one hundred angstroms.

From the above-mentioned observation and experiments it has been concluded that the target for use in the SEC vidicon is required to satisfy the following conditions.

(1) The secondary electron emitting layer of the target should have a high melting point and yet be stable to moisture or a alkaline metal. Preferably, the emitting layer has a melting point of above 900° C and a water solubility of 1 gr/100 cc or less.

(2) The electric resistance of a base material forming the secondary electron emitting layer should be higher than that of MgO (3) The probability with which the secondary and tertiary particles are formed during the process of forming the secondary electron emitting laryer should be small. Even if, in some cases, the secondary and tertiary particles are formed, the average size thereof should be several microns or less.

(4) In order to satisfy the condition of item (3), the average size of the primary particles should range from scores of angstroms to one hundred angstroms.

(5) Preferably, the bulk density of the secondary electron emitting layer ranges from 0.1 to 5% (when the bulk density of the base material is set at 1) from the stand point of maintaining the crystalline particles constituting the layers stable and rendering the secondary electron multiplication gain large. Where the average particle size of the crystalline particles of the layer is small (in this case, the layer density is low), the surface area of the layer is large and the stability thereof is low. Where said average size is large (in this case, the layer density is high), the secondary electron multiplication gain is small.

The above restriction of average size of the primary particles is for purpose of solving the following problems. That is, where the average size of the primary particles is less than scores of angstroms, the physical and chemical properties of the secondary electron emitting layer are unstable. Where the average size of the primary particles exceeds one hundred angstroms, the tertiary particles each having a particle size of 10 $\mu$m or more is likely to be formed to deteriorate the picture quality of the SEC vidicon.

PREFERRED EMBODIMENTS OF THE INVENTION

Figure 4:
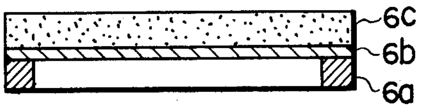
FIG. 4 is an enlarged sectional view of the target shown in FIG. 1.
Figure 5:
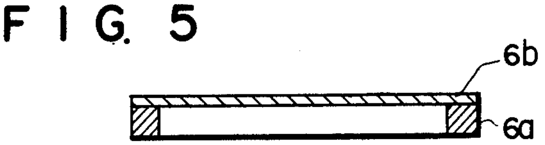
FIG. 5 is a sectional view of a support film of the secondary electron emitting layer of the target shown in FIG. 4.

A secondary electron multiplication target 6 shown in FIG. 4 comprises a metal ring *6a*, a conductive thin film *6b* stretched over the metal ring *6a*, such as an aluminium layer having a thickness of about 700 angstroms, and a secondary electron emitting porous layer *6c* deposited on the aluminium layer. The conductive thin layer *6b* functions not only as a support plate for supporting the porous layer *6c* but also as a signal plate for exteriorly drawing out an image signal through the metal ring *6a*. A construction of the support plate *6b* is shown in FIG. 5. In order to prepare this support plate, an NC film (made of nitro cellulose) is first stretched over the metal ring *6a* and then Al layer *6b* having a thickness of about 700 angstroms is formed on the NC film, and thereafter the resulting structural body comprising the NC film is burnt in an atmosphere containing oxygen at a temperature of 200° C or more thereby burning away the NC film, thus to obtain such a support film as shown in FIG. 5. The secondary electron emitting layer *6c* is a porous layer consisting of fine particles of $CaF_2$ or $MgF_2$ or $SrF_2$, said fine particles consisting mainly of primary particles each having an average particle size of scores of angstroms to one hundred angstroms. Hereinafter, an example of the cases of manufacturing a target having a secondary electron emitting layer made of $MgF_2$ is explained.

A bell-jar 22 is prepared. At a lower part of the bell-jar interior is disposed an electrically communicable boat 24 in which a proper amount of $MgF_2$ 23 is received. The support plate *6b* as manufactured above is disposed spaced about 10 cm from the boat with the metal ring *6a* upwardly directed. The bell-jar 22 is provided with a main valve 25 for gas exhaustion, a variable leakage valve 26 for inert gas introduction and a vacuum gauge 27 for gauging a pressure of 0.1 to scores of Torrs, such as a Pirani gauge. For example, argon gas was introduced as the inert gas and the pressure within the bell-jar was controlled to 1 Torr. The temperature of the boat was set at a temperature of 1300° C to 1600° C so that the evaporation rate of $MgF_2$ became 0.2 to 1.0 mg/sec. By so doing, the inert gas in the neighbourhood of the boat heated due to the heat evolution of the boat rapidly rose. Accordingly, the $MgF_2$ was not simply evaporated but did also the $MgF_2$ vapor rapidly rise on a heated gas current of inert gas to be blown onto the support film *6b*. That is, the probability was decreased that the primary particles of $MgF_2$ collided with other primary particles, followed by little formation of the secondary particles.

Figure 1:
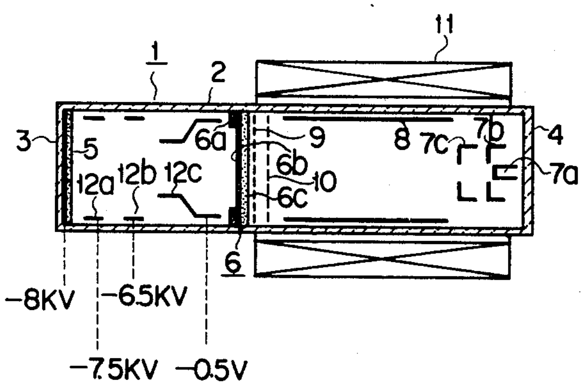
FIG. 1 is a longitudinal sectional view of an SEC vidicon (secondary electron conduction type vidicon) to which a secondary electron multiplication target of the invention is applied.
Figure 2:
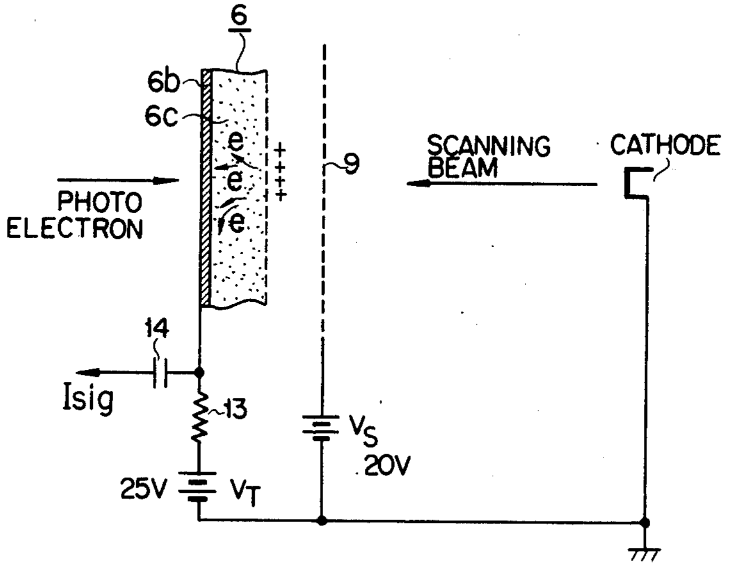
FIG. 2 is an enlarged view of the arranging and coupling relationship between the secondary electron multiplication target, mesh like suppressing electrode and electron gun cathode of the SEC vidicon shown in FIG. 1.
Figure 3:
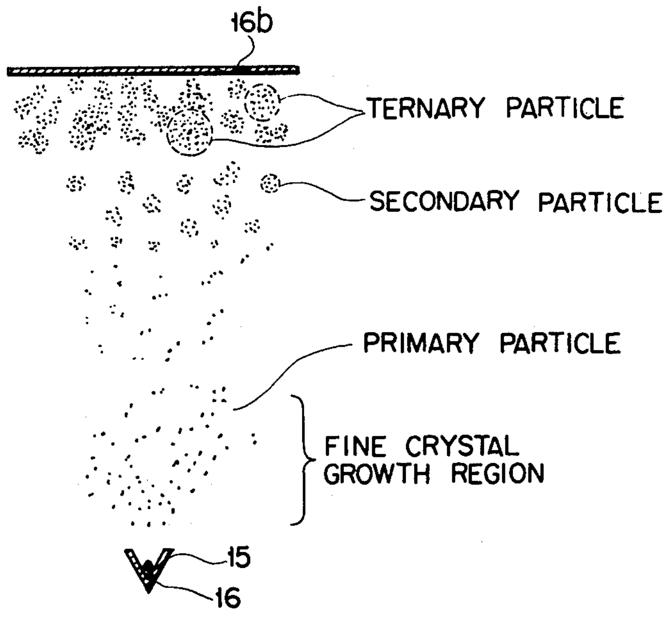
FIG. 3 is a view for generally explaining a connected condition of the constituent fine particles of a secondary electron emitting layer produced during the process in which it is formed on a support film.
Figure 6:
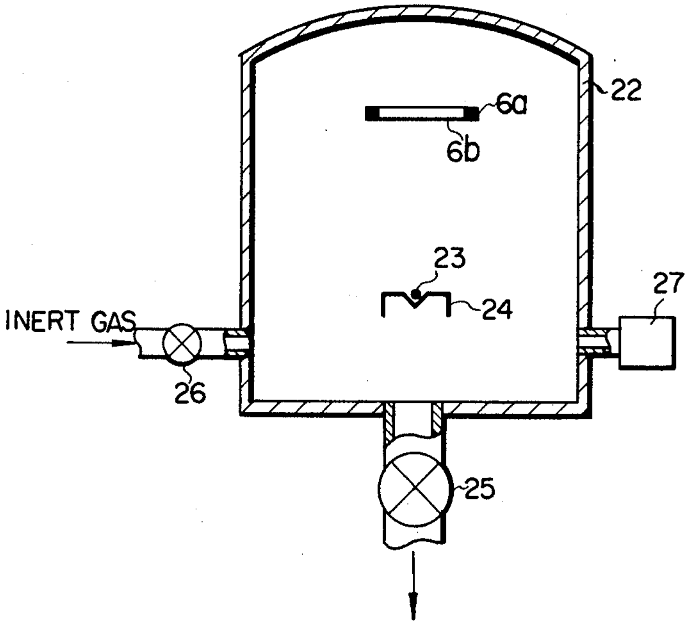
FIG. 6 is a vertical sectional view of an example of an apparatus for manufacturing the target of the invention.
Figure 7:
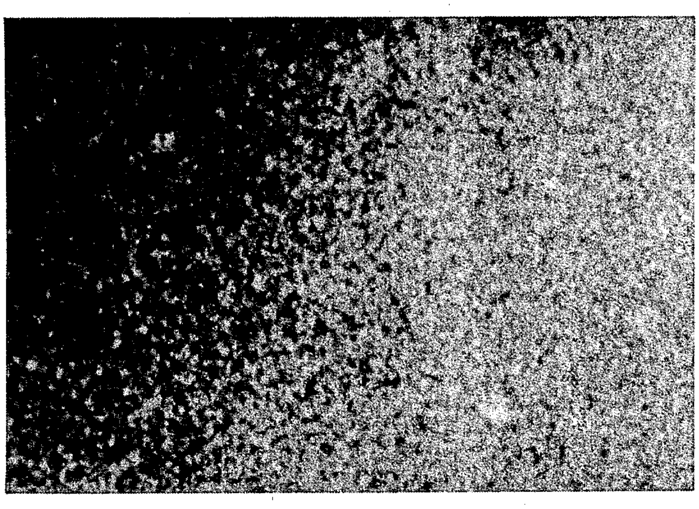
FIG. 7 is a photograph of a secondary electron emitting surface of the target according to the invention comprising a $MgF_2$-made layer.
Figure 8:
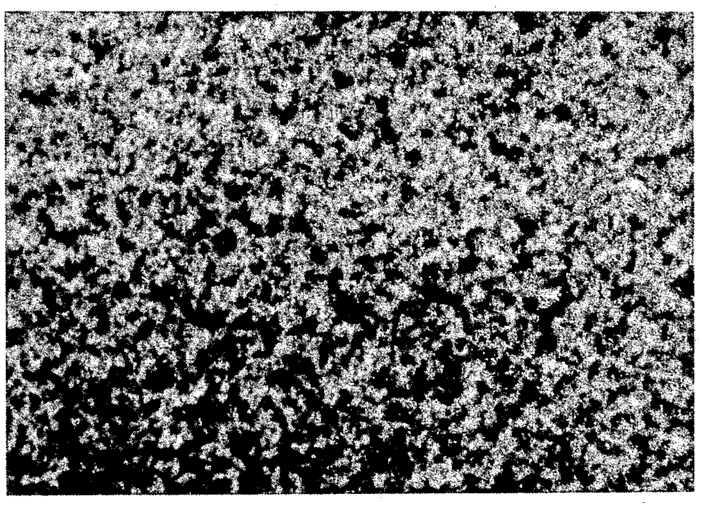
FIG. 8 is a photograph of a secondary electron emitting surface of the conventional target comprising a KCl-made layer.

The target formed in the above-mentioned manner was drawn out from the bell-jar and was subject to observation by electron microscope. As a result it was confirmed that the secondary electron emitting layer *6c* consisted mainly of an aggregate of primary particles having an average particle size of scores of angstroms to one hundred angstroms. The tertiary particles each had a size of 10 $\mu$m or less. The thickness of the secondary electron emitting layer *6c* is suitably in the range of several to scores of microns. When this thickness is too small, the capacity between the surface of the emitting layer *6c* and the signal plate *6b* becomes large to deteriorate the lag or after image characteristics of the pickup tube. In contrast, when that thickness is too large, the resolution is decreased. As seen from FIG. 7, a photograph obtained by enlarging the surface of the secondary electron emitting layer of said target to 800 times the original surface thereof by a scanning electron microscope had few grainy portions. The porous layer of the target shown in FIG. 7 mainly includes primary particles each having an average particle size ranging from scores of angstroms to 100 angstroms. The size of ternary particles appearing in FIG. 7 is about 2 to 3 microns. This corresponds to an unevenness having a cycle (this means a spacial frequency of unevenness appearing on a receiver screen) corresponding to about 40 to 60 microns in a receiver. Such a size of ternary particles does not result in a grainy picture. On the contrary, as seen from FIG. 8, a photograph obtained by similarly enlarging the surface of the secondary electron emitting layer of a conventional target using KCl to 300 times the original surface thereof by a scanning electron microscope had clearly some grainy portions. The size of the ternary particles as shown in FIG. 8 is about 10 to 13 microns. This size leads to an unevenness having a cycle corresponding to about 200 to 260 microns (μm) in a receiver. This, of course, results in a grainy picture. As a result of applying the $MgF_2$ target according to this embodiment to the SEC vidicon shown in FIG. 1 and comparing it with the SEC vidicon using a conventional target (KCl or MgO target), the former SEC vidicon was confirmed to have been greatly improved in respect of the picture quality and satisfactory also in respect of other characteristics.

Where the secondary electron emitting layer was formed from $CaF_2$, the apparatus of FIG. 6 was employed in an atmosphere of argon having an interior pressure of about 1 Torr; the temperature of the boat was set at a temperature between 1400° C and 1700° C and the evaporation rate of $CaF_2$ was set at 0.2 to 1.0 mg/sec. Where the secondary electron emitting layer was formed from $SrF_2$, the apparatus of FIG. 6 was employed in an atmosphere of argon having an interior pressure of about 1 Torr; the temperature of the boat was set at a temperature between 1350° C and 1700° C; and the evaporation rate of $SrF_2$ was set at 0.2 to 1.0 mg/sec. As a result, the target having the above-formed secondary electron emitting porous layer made of $CaF_2$ or $SrF_2$ confirmed to have characteristics similar to those of the target based on the use of $MgF_2$, and the SEC vidicon having such target incorporated therein was also confirmed to have better picture quality and characteristics than the conventional SEC vidicon.

A mass prepared by fully mixing 20 weight % of $MgF_2$ powder and 80 weight % of $CaF_2$ powder and sintering the mixed powder was charged as an evaporation source in a boat, and deposited on a support layer at a boat temperature of 1300° C to 1700° C in an argon atmosphere having a pressure of about 1 Torr, thus to obtain a target having good characteristics. Since the secondary electron emitting layer of this target contains the $MgF_2$ having great capability of emitting secondary electrons and the $CaF_2$ having high resistance to heat, the respective properties of these components can be effectively utilized simultaneously. And it was confirmed that if, in said sintered material, any one of said components $MgF_2$ and $CaF_2$ is set at either 20 or 80 weight % and the other is set at the remaining weight %, the resulting target would be able to have characteristics similar to the above-mentioned. Further, it was confirmed that also in the case where any one of given two of said $CaF_2$, $MgF_2$ and $SrF_2$ was set at either 20 or 80 weight % and the other was set at the remaining weight %, the resulting target had better characteristics than the conventional target.

Figure 9:
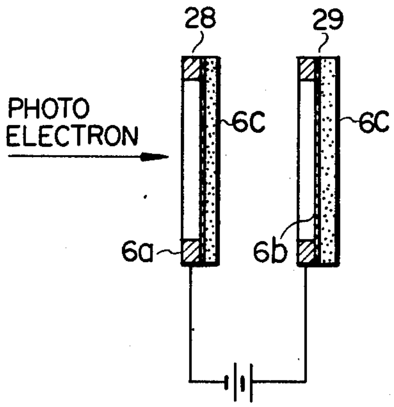
FIG. 9 shows the electrically coupling relationship between the targets in the case where the target according to the invention is applied to a multistage-image amplifier tube.

The target according to the invention can be applied also to a transmission type secondary electron multiplier tube such as a multistage image multiplier tube. The construction of the target itself for use in this multiplier tube is the same as that of the target for use in the SEC vidicon. In this type of target, however, the secondary electrons emitted by incidence of photoelectrons into the target are transmitted through the secondary electron emitting layer without being driven toward the signal plate of the same target. In FIG. 9, the arranging and coupling relationship between targets for use in the multistage image multiplier tube are shown by taking as an example the case where two targets are provided. The secondary electrons emitted from within a first target 28 due to the incidence of photoelectrons into the target 28 are transmitted through the conductive support plate 6b of a second target 29 as primary electrons to cause secondary electrons to be emitted from the secondary electron emitting layer of the second target 29. The secondary electrons from the second target 29 are allowed to collide with a fluorescent surface (not shown) to obtain a visible image.

What is claimed is:

1. A secondary electron multiplication target for a secondary electron conducting type vidicon comprising an electrically conductive support layer and a secondary electron emitting layer provided on that side of said support layer which faces a cathode emitting scanning electrons, wherein said secondary electron emitting layer is a porous layer consisting of an agglomeration of primary particles of at least one compound selected from the group consisting of $CaF_2$, $MgF_2$ ,and $SrF_2$; said porous layer being formed by evaporating said compound from an evaporating source and said primary particles being those unagglomerated particles which are just emitted from said evaporating source and each have an average particle size ranging from scores of angstroms to 100 angstroms.

2. A secondary electron multiplication target for a secondary electron conducting type vidicon according to claim 1, wherein said selected one compound is $MgF_2$.

3. A secondary electron multiplication target for a secondary electron conducting type vidicon according to claim 1, wherein said selected one compound is $CaF_2$.

4. A secondary electron multiplication target for a secondary electron conducting type vidicon according to claim 1, wherein said selected one compound is $SrF_2$.

5. A secondary electron multiplication target for a secondary electron conducting type vidicon according to claim 1, wherein the density of said porous layer is 0.1 to 5% of the density of said compound or compounds constituting said porous layer.

* * * * *

UNITED STATES PATENT AND TRADEMARK OFFICE
CERTIFICATE OF CORRECTION

PATENT NO. : 4,131,820

DATED : December 26, 1978

INVENTOR(S) : Hiroshi Washida

It is certified that error appears in the above-identified patent and that said Letters Patent are hereby corrected as shown below:

Please insert the following Priority Data:

--[30] March 25, 1975 Japan.............50-34995--

Signed and Sealed this

*Fifteenth* Day of *May 1979*

[SEAL]

*Attest:*

RUTH C. MASON
*Attesting Officer*

DONALD W. BANNER
*Commissioner of Patents and Trademarks*